US008288910B1

(12) United States Patent
Van Neste

(10) Patent No.: US 8,288,910 B1
(45) Date of Patent: Oct. 16, 2012

(54) MULTI-WINDING HOMOPOLAR ELECTRIC MACHINE

(75) Inventor: Charles W. Van Neste, Kingston, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 13/549,575

(22) Filed: Jul. 16, 2012

Related U.S. Application Data

(62) Division of application No. 12/819,717, filed on Jun. 21, 2010, now Pat. No. 8,247,942.

(51) Int. Cl.
*H02K 31/00* (2006.01)
*H02K 3/00* (2006.01)

(52) U.S. Cl. .................................. 310/178; 310/181

(58) Field of Classification Search ............. 310/156.08, 310/156.14, 115, 152, 177, 178, 181, 219, 310/261.1; 318/139, 558
See application file for complete search history.

(56) References Cited

U.S. PATENT DOCUMENTS

| 3,293,470 | A | * | 12/1966 | Polgreen | 310/178 |
| 3,513,340 | A | | 5/1970 | Appleton | |
| 4,237,395 | A | * | 12/1980 | Loudermilk | 310/113 |
| 4,831,299 | A | | 5/1989 | Hayasaka | |
| 5,278,470 | A | | 1/1994 | Neag | |
| 5,942,829 | A | * | 8/1999 | Huynh | 310/178 |
| 5,977,684 | A | | 11/1999 | Lin | |
| 6,049,150 | A | | 4/2000 | Chudleigh, Jr. | |
| 7,362,026 | B2 | | 4/2008 | Morozov et al. | |
| 7,986,069 | B2 | * | 7/2011 | Takeuchi | 310/156.43 |
| 8,247,942 | B2 | * | 8/2012 | Van Neste | 310/178 |
| 2005/0073206 | A1 | | 4/2005 | Wilsdorf | |
| 2010/0079023 | A1 | * | 4/2010 | Jang | 310/152 |

FOREIGN PATENT DOCUMENTS

| GB | 1345154 | 1/1974 |
| WO | 2004006304 | 1/2004 |
| WO | 2009147377 | 12/2009 |

OTHER PUBLICATIONS

A.K. Das Dupta, Design of Self-Compressed High-Current Comparatively Higher Voltage Homopolar Generators, Transactions of the American Institute of Electrical Engineers Power Apparatus and Systems, pp. 567-573 (Oct. 1961).
J.H. Price, J.H. Gully, and M.D. Driga, The High Voltage Homopolar Generator, IEEE Transactions on Magnetics, vol. Mag-22, No. 6, pp. 1690-1694 (Nov. 1986).
Perry Tsao, Matthew Senesky, and Seth Sanders, A Synchronous Homopolar Machine for High-Speed Applications, Conference Record of the IEEE IAS Annual Meeting, pp. 406-416 (2002).

* cited by examiner

*Primary Examiner* — Tran Nguyen
(74) *Attorney, Agent, or Firm* — Warner Norcross & Judd LLP

(57) ABSTRACT

A multi-winding homopolar electric machine and method for converting between mechanical energy and electrical energy. The electric machine includes a shaft defining an axis of rotation, first and second magnets, a shielding portion, and a conductor. First and second magnets are coaxial with the shaft and include a charged pole surface and an oppositely charged pole surface, the charged pole surfaces facing one another to form a repulsive field therebetween. The shield portion extends between the magnets to confine at least a portion of the repulsive field to between the first and second magnets. The conductor extends between first and second end contacts and is toroidally coiled about the first and second magnets and the shield portion to develop a voltage across the first and second end contacts in response to rotation of the electric machine about the axis of rotation.

7 Claims, 6 Drawing Sheets

MULTI-WINDING HOMOPOLAR ELECTRIC MACHINE

This invention was made with government support under Contract No. DE-AC05-00OR22725 awarded by the U.S. Department of Energy. The government has certain rights in the invention.

BACKGROUND OF THE INVENTION

The present invention relates to homopolar electric machines, and more particularly, to homopolar electric machines that can achieve greater output voltages at lower rotational speeds.

Homopolar electric machines, also known as Faraday disc machines, were first developed by Michael Faraday in the $19^{th}$ century. They operate through an effect known as the Lorentz force in which a charged particle moving through a uniform magnetic field encounters a force perpendicular to the movement and magnetic field direction. This force is expressed in the formula, $$F = q(E + v \times B) \quad (1)$$

where F is the force, q is the charge of the particle, E is the presence of an electric field interacting with the charged particle, v is the velocity of the charged particle, and B is the magnetic field intensity.

In the prior art, the simplest form of homopolar machine is a disk magnet that is rotated about its vertical poles. Electric connections are made through brushes, belts, or liquid metal contacts applied to the periphery and the center axis. When the disk magnet is rotated, a small DC voltage develops across the contacts. This voltage is dependent in part on the speed of rotation. When a load is applied, the current flow is typically large—causing the machine to be classified as a DC current source.

A major limiting factor of prior art homopolar machines has been the low voltage output with high rotational speeds. Although the current output may be large, modern loads seldom require high current at low voltage—with most preferring the opposite. Power electronics can modify the low voltage homopolar output to accommodate such loads; however, this is not a common practice since there exists a plethora of other electric machines that more readily satisfy the load requirements. The disadvantage with most electric machines (and generators in particular) is that their output is directly dependent on the speed of rotation; the faster the rotation, the higher the voltage output. Gear boxes are employed in the art when low RPMs are required. Therefore, there is a need for an apparatus which can leverage the benefits of a homopolar electric machine for operation across a range of RPMs while also developing output voltages normally developed at higher-RPMs.

SUMMARY OF THE INVENTION

The aforementioned problems are overcome by the present invention which provides a multi-winding homopolar electric machine including a shaft defining an axis of rotation, first and second spaced-apart magnets being coaxial with the shaft and each including a charged pole surface and an oppositely charged pole surface, a shield extending between the first and second magnets, and a conductor coiled about the first and second magnets and extending across similarly charged pole surfaces to develop a voltage across the conductor when the electric machine is rotated about the axis of rotation.

In one embodiment, the pole surfaces are perpendicular to the axis of rotation and form a repulsion field between the first and second magnets. In this embodiment, the shield includes an outer portion extending between an outer radial portion of the first magnet and an outer radial portion of the second magnet to at least partially confine the repulsion field to between the first and second magnets. In addition, the shield may include an inner portion extending between an inner radial portion of the first magnet and an inner radial portion of the second magnet to at least partially confine the repulsive field on the radially inward side of the first and second magnets.

In another embodiment, the pole surfaces are parallel to the axis of rotation and form a repulsion field between the first and second magnets. In this embodiment, the shield includes a first shield portion extending between an upper axial portion of the first magnet and an upper axial portion of the second magnet, and a second shield portion extending between a lower axial portion of the first magnet and a lower axial portion of the second magnet. In this embodiment, the first magnet is concentric with the second magnet and defines an inner radius greater than the outer radius of the second magnet.

In yet another embodiment, the first and second magnets and the shield form a toroid-shaped core rotatable in unison with the shaft. In this embodiment, the conductor is helically or spirally wound about at least a portion of the toroid-shaped core to develop a voltage across the end portions of the conductor when the toroid-shaped core is rotated about the axis of rotation. The helically or spirally wound conductor can extend along a portion of the toroid-shaped core or can circumferentiate the core to form a multi-winding toroid conductor.

In yet another embodiment, the first and second spaced-apart magnets are concentric and form an attractive magnetic field therebetween. In this embodiment, the first magnet defines an axial width greater than the axial width of the second magnet. In addition, the shield includes first and second shield portions extending perpendicular to the axis of rotation to at least partially confine the attractive magnetic field to between the first and second magnets. In this embodiment, rotation of the electric machine can develop a net voltage across the end portions of the conductor for transfer to a load, for example.

The above embodiments of the present invention provide a simple and effective homopolar electric machine operable across a range of RPMs to develop an improved DC output over prior art homopolar machines. In the above embodiments, a toroidal conductor is primarily exposed to fields of the same magnetic polarity to develop a cumulative voltage across the same. First and second shield portions reduce the conductor's exposure to a magnetic field having an opposite polarity. As a result, a 'reverse' current that might otherwise cancel the current generated in the conductor is reduced. In addition, the added windings are effectively cumulative to develop an increased voltage across the conductor over prior art homopolar electric machines having only a single winding.

These and other features and advantages of the present invention will become apparent from the following description of the invention, when viewed in accordance with the accompanying drawings and appended claims.

DETAILED DESCRIPTION OF THE CURRENT EMBODIMENT

The invention as contemplated and disclosed herein can greatly improve the performance of homopolar electric machines over known homopolar systems and methods. In particular, the system and method set forth below utilizes multiple windings to provide a high voltage output for a given power input, and conversely, provides a high power output for a given electrical voltage applied across the conductive winding.

Figure 1:
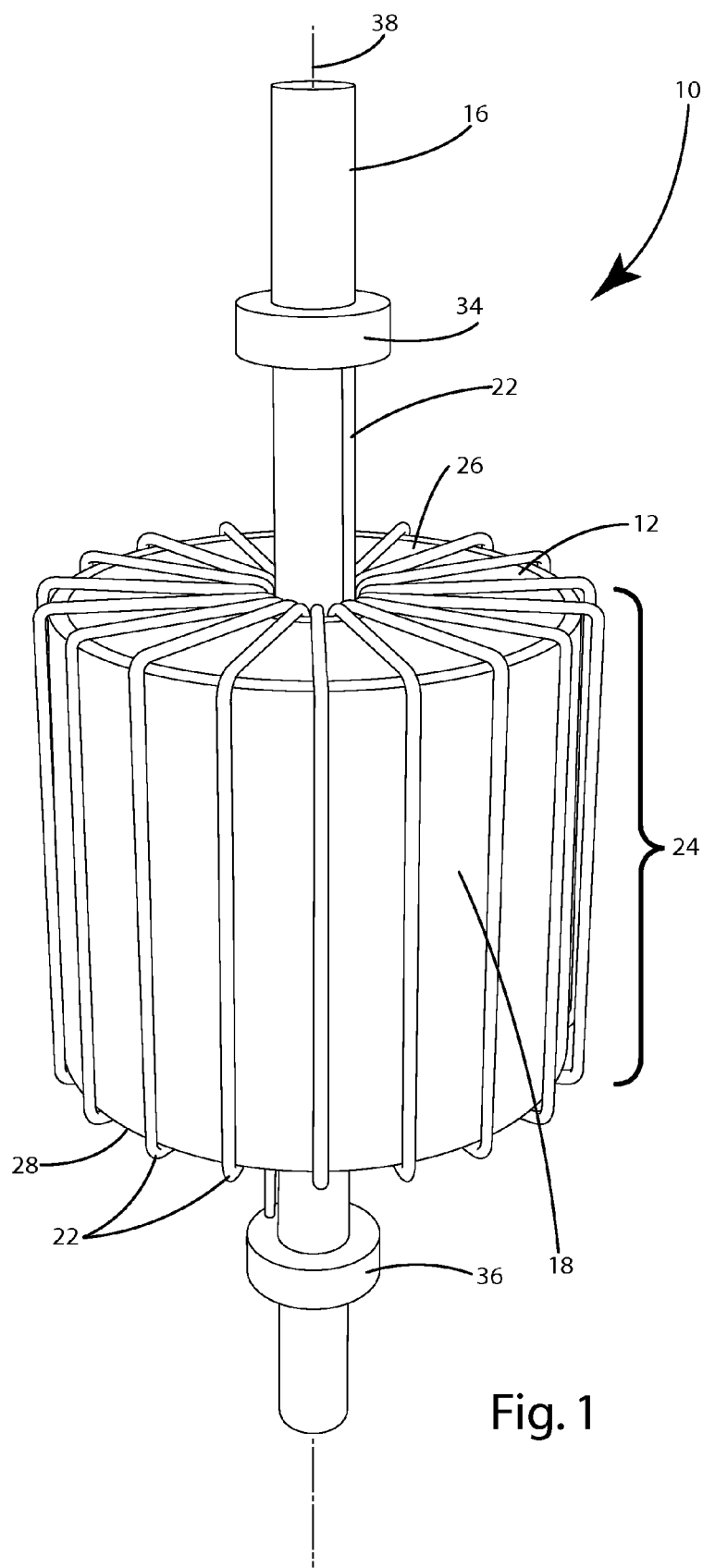
FIG. 1 is a perspective view of a multi-winding homopolar electric machine according to a first embodiment of the invention.
Figure 2:
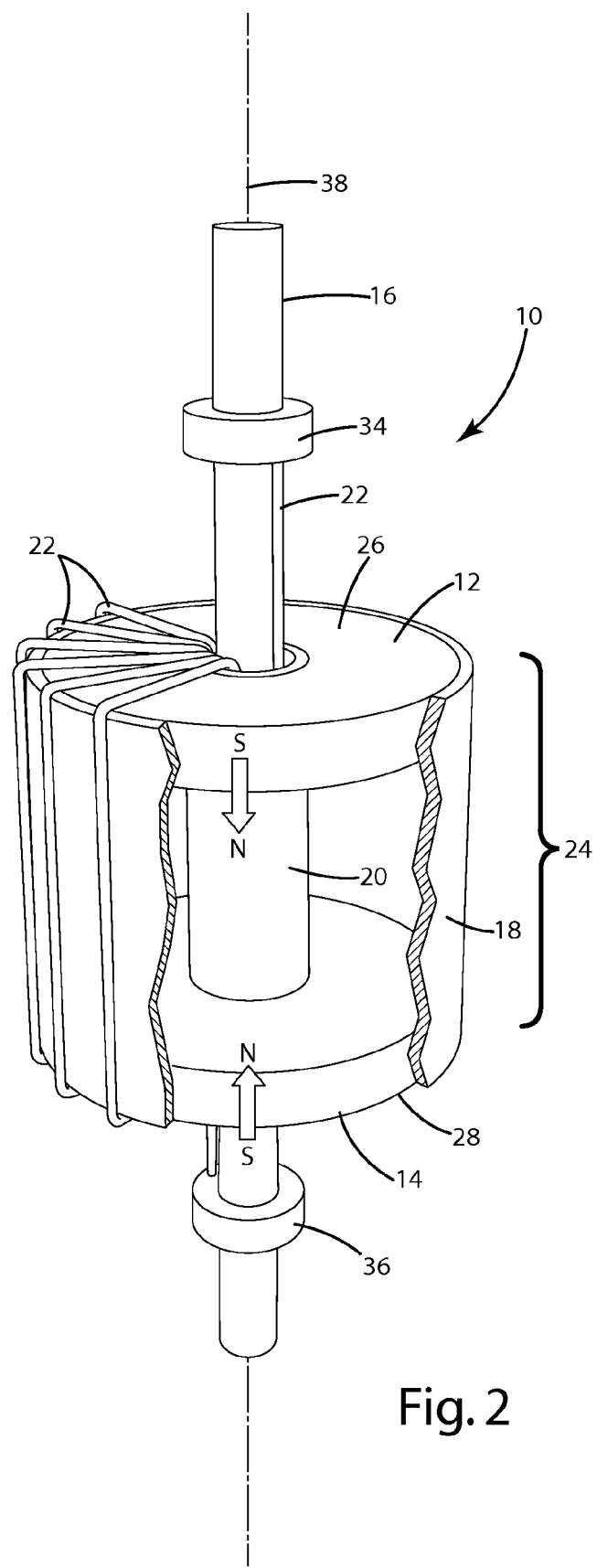
FIG. 2 is a broken sectional view of the multi-winding homopolar electric machine of FIG. 1.

A multi-winding homopolar electric machine in accordance with a first embodiment of the present invention is shown in FIGS. 1-2 and generally designated 10. The electric machine 10 includes two coaxial disk- or ring-shaped magnets 12, 14 mounted about a central shaft 16, first and second electromagnetic shielding layers 18, 20 enclosing an annular region between the first and second magnets 12, 14, and a conducting element 22 spirally or helically wound or coiled around the first and second magnets 12, 14 and the shielding layers 18, 20. The central shaft 16 can be fitted within a cylinder 24—optionally formed from the first and second magnets 12, 14 and the first and second shielding layers 18, 20—according to any suitable method. For example, the central shaft 16 can be secured to the core of the cylinder 24 by staking the shaft 16 within the cylinder 24, optionally with an accessory such as a gear, hub or pulley. The central shaft 16 can also be frictionally fitted within the core of the cylinder 24, or can be secured within the cylinder 24 via fastening means such as a rod, key or pin (optionally embedded in the inner shielding layer 20) interposed between the central shaft 16 and the inner shielding layer 20. As shown in the partially broken sectional view of FIG. 2, the first and second magnets 12, 14 and the first and second shielding layers 18, 20 form a toroid-shaped core or cylinder 24 in coaxial alignment with the central shaft 16 and operatively mounted about the same. As also shown, first and second magnets 12, 14 are axially magnetized and are positioned in magnetic repulsion with respect to each other, e.g., the upper and lower magnetic surfaces 26, 28 of the cylinder 24 share the same magnetic polarity. In the illustrated embodiment, the North poles are in repulsion, and in other embodiments, the South poles are in repulsion.

To at least partially confine the mutually repulsive magnetic field to the annular region between the first and second magnets 12, 14, the first shielding layer 18 forms the outer diameter of the toroid-shaped core or cylinder 24, and the second shielding layer 20 forms the inner diameter of the toroid-shaped core or cylinder 24. The first and second shielding layers 18, 20 can extend partially between the first and second magnets 12, 14, or can extend fully between the first and second magnets 12, 14 as shown in FIGS. 1-2. The first (or outer) shielding layer 18 and the second (or inner) shielding layers 20 can each include a tube of magnetically conductive material. The magnetically conductive tubes can each be formed as a unitary component, or can instead be formed by joining vertical halves of a cylinder to facilitate assembly of the electric machine. The magnetically conductive material can include ferrous materials (e.g., iron, steel, mu-metal) or non-ferrous materials (e.g., nickel and chromium) suitable to confine at least a portion of the repulsive magnetic field to between the first and second magnets 12, 14. It should be noted that the shielding layers 18, 20 are not required to be in direct contact with either or both of the first and second magnets, and can be secured thereto by any suitable means. For example, the shielding layers 18, 20 can be friction fitted to the first and second magnets, and/or can be secured to the first and second magnets using an epoxy or adhesive, for example.

As also shown in FIG. 1, the conducting element 22 is wound N number of times vertically along the length of the cylinder 24 in a helical pattern over the cylinder exterior, similar to the windings of a toroid coil. While the conducting element is shown in FIG. 1 as being spirally wound substantially about the circumference of the cylinder 24, the conducting element can also be wound over only a portion of the cylinder as shown in FIG. 2. The conducting element 22 can be a conducting wire forming a single closed circuit when its end portions are connected across a load. In addition, the conducting element can be covered (e.g., sheathed) with a non-conductive coating, uncovered (e.g., bare) or both as desired. In the present embodiment, the conducting wire end portions are electrically coupled to first and second contacts 34, 36 disposed on or about the central shaft 16. In addition, first and second contacts 34, 36 may be positionable at multiple positions along the central shaft 16 and are electrically insulated from each other. The contacts 34, 36 may be electrically coupled to the load (not shown) by any suitable means, such as by a liquid metal including mercury or gallium alloy. Alternatively, the contacts 34, 36 may be connected to a load through brushes (not shown) or a conducting belt system (not shown).

In operation, the electric machine 10 is rotated about its longitudinal axis 38. Electrons in the windings along the upper and lower magnetic surfaces 26, 28 of the cylinder 24 encounter a Lorentz force due to the radial speed gradient of the cylinder 24, causing a voltage to develop along each section of wire crossing a magnetic pole. Since each section of wire is connected, the voltage is additive over the entire length of the winding 22. The equation governing the voltage developed in a prior art homopolar machine is:

$$V = -\omega B(r_o^2 - r_i^2) \tag{2}$$

where $\omega$ is the angular frequency, B is the magnetic field intensity, $r_o$ and $r_i$ are the outer radius and inner radius of the cylinder, respectively. Equation 2 is derived by taking Equation 1, setting the force equal to zero, and integrating the electric field over the path traversed by the current. Since the path generally crosses two magnetic poles, the half term from integration is canceled. In the present embodiment, however, the voltage from Equation 2 is multiplied for each winding section. Therefore the equation for the present invention becomes:

$$V = -\omega NB(r_o^2 - r_i^2) \tag{3}$$

where N corresponds to the number of turns of the wire about the cylinder 24. By increasing the number of turns, the voltage and speed can be made to essentially any value. For example, if the present invention is utilized as a generator that must supply 5V to a load, with 1000 turns of wire the speed required to develop 5V would be 1000 times less than a single-turn prior art homopolar machine. If the operating parameters of the prior art homopolar machine required 1000 RPMs to produce 5V, the present invention would require 1 RPM for the same voltage output. The corresponding counter torque would also be additive, causing the rotation to require higher torque at 1 RPM. Accordingly, the present embodiment provides an increased output voltage over known homopolar systems without the need for complicated gearing assemblies to generate large rotational velocities, while at the same time providing variability in the electrical or mechanical output based at least in part on the number of turns of the conducting element 22.

As previously set forth, the homopolar machine 10 of the present invention can be utilized to convert energy from a mechanical state to an electrical state, e.g., for converting a rotary force into a DC voltage. As one of ordinary skill in the art will readily appreciate, the homopolar machine 10 can also convert energy from an electrical state to a mechanical state, for example, by applying DC electrical power to the contacts 34, 36. In addition, first and second magnets 12, 14 may be a single magnet or multiple individual magnet sections centered around or at the central axis of rotation 38. In instances where the magnets 12, 14 are composed of multiple individual magnets, the shielding layers 18, 20 may be thicker in the region between each magnet, defining an overall thickness smaller than the diameter of each of the first and second magnets 12, 14. Together, the shielding layers 18, 20 and the magnets 12, 14 form the toroid-shaped core or cylinder 24, alternatively described as a rotor assembly. The conducting element 22 is wound helically around the vertical length of the rotor 24 such that the conducting element 22 crosses the magnetic poles at the upper and lower surfaces 12, 14 of the rotor 24.

Additionally, the cylinder or rotor 24 can define a reduced longitudinal dimension in combination with an increased radial dimension to increase exposure of the conducting element 22 to the first and second magnetic surfaces 26, 28, while decreasing exposure of the conducting element 22 to the shielding layers 18, 20. As noted above, the first and second shield layers 18, 20 are operative to reduce the conductor element's 22 exposure to a magnetic field having an opposite polarity along the inner and outer radial portions of the cylinder 24. As a result, a 'reverse' current that might otherwise cancel the current generated in the conducting element 22 is reduced. In addition, the number of turns and the corresponding spacing between adjacent turns of the conducting element 22 may vary depending on the required power output of the homopolar machine 10. The turns may be symmetrically spaced to form a toroidal winding about the rotor 24, or the turns may be asymmetrically spaced from each other.

Figure 3:
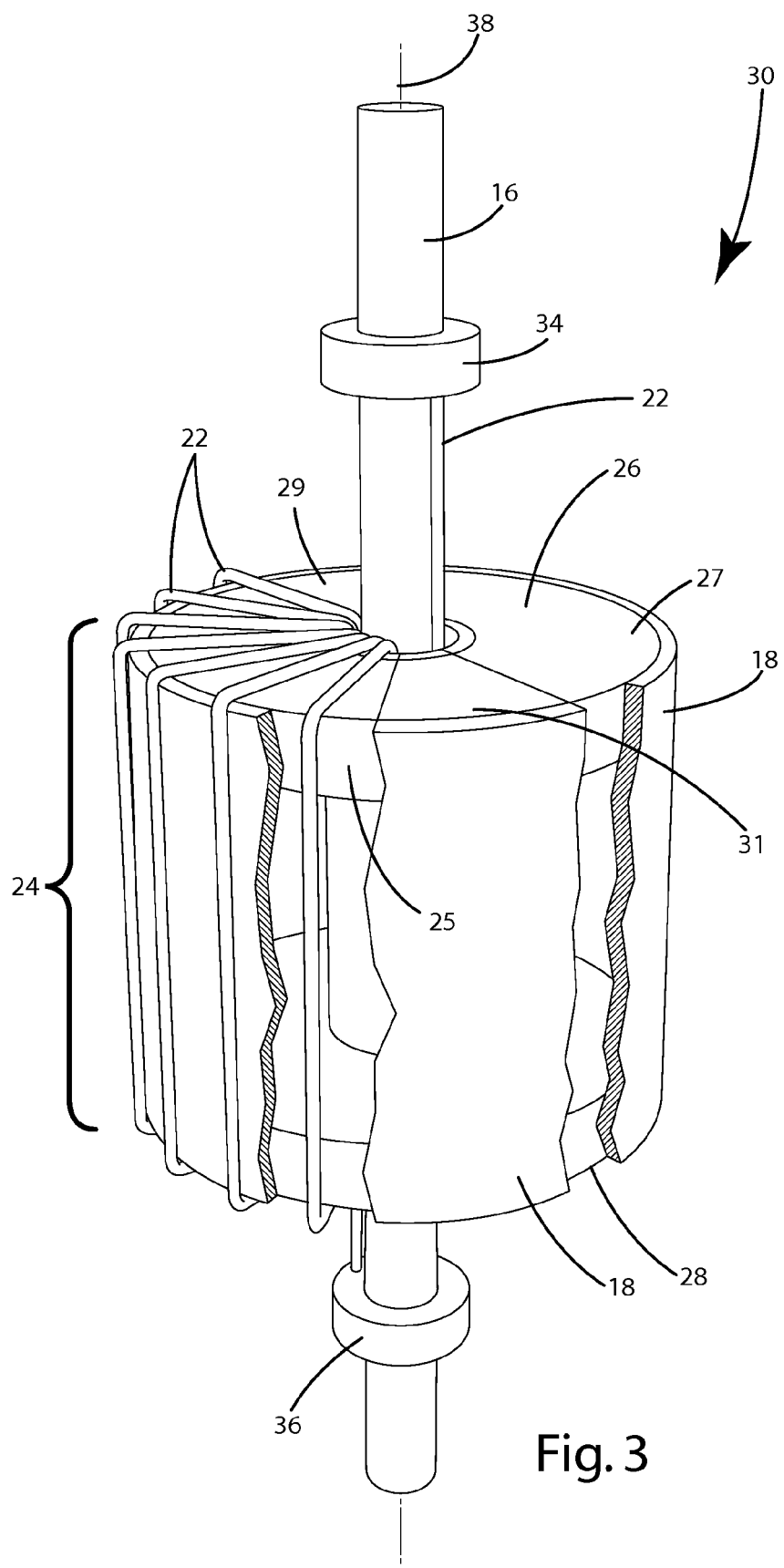
FIG. 3 is a perspective, broken sectional view of the multi-winding homopolar electric machine according to a second embodiment of the invention.
Figure 4:
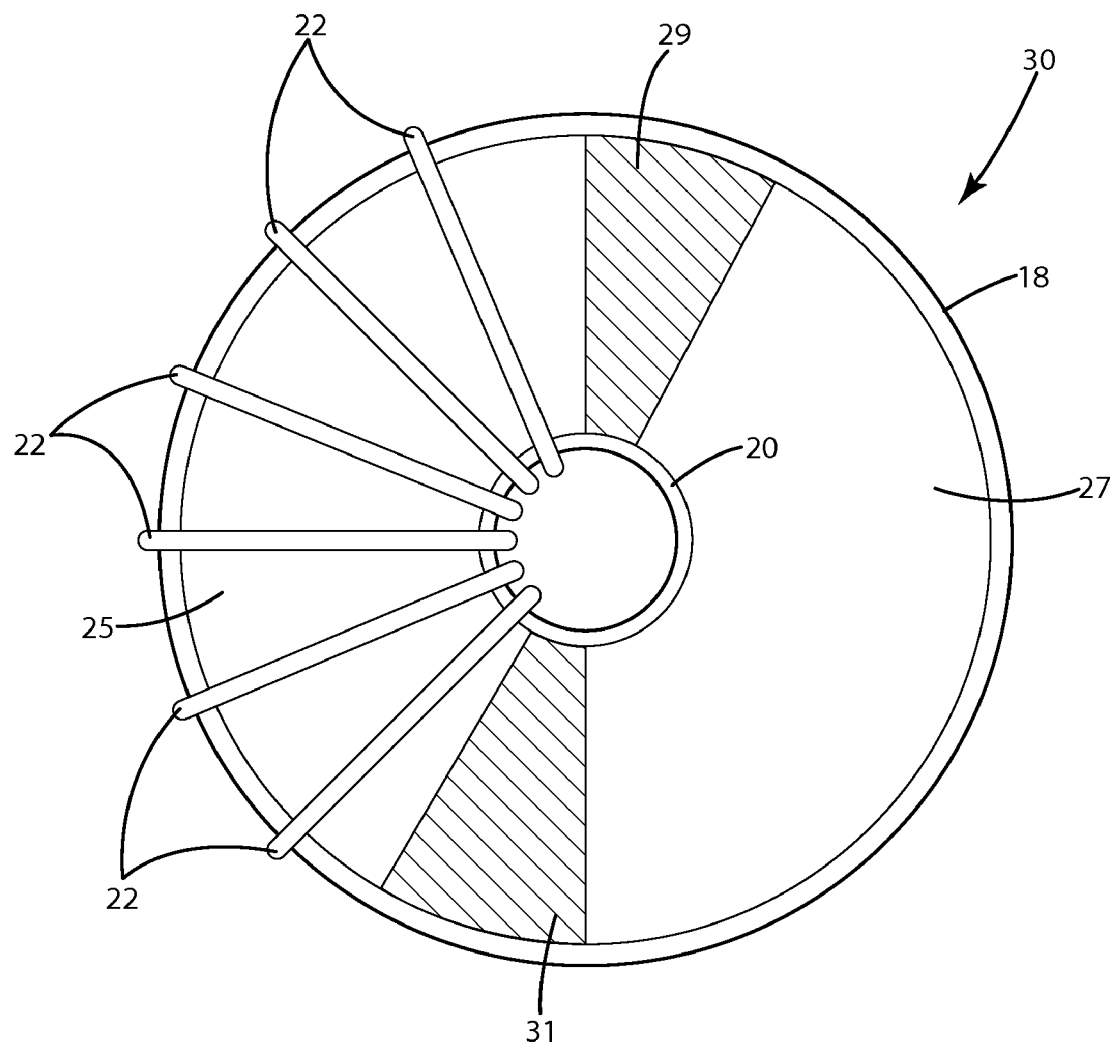
FIG. 4 is a top view of the multi-winding homopolar electric machine of FIG. 3.

A second embodiment is shown in FIGS. 3-4 and is generally designated 30. In this embodiment, the upper and lower surfaces 26, 28 of the cylinder 24 are formed from multiple magnetic sections 25, 27 separated by first and second wedge-shaped longitudinal shielding portions 29, 31. The longitudinal shielding portions 29, 31 interconnect the outer and inner shielding layers 18, 20 and can be formed from a solid rod of magnetic material machined or can be cast according to any suitable manufacturing method. The shielding portions 29, 31 can extend vertically between the upper and lower surfaces 26, 28, or can instead be proportioned with a width similar to that of the magnetic sections 29, 31, for example. As also shown in FIGS. 3-4, the conductive element 22 extends across the upper surface 26 of the cylinder 24 adjacent the first magnetic section 25. Alternatively, the conductive element 22 can also extend across the upper surface 26 of the cylinder 24 adjacent the second magnetic section 27 while avoiding the longitudinal shielding portions 29, 31, which are shown as being formed of a different material than that of the adjacent magnetic sections 25, 27. By avoiding the horizontal shielding portions 29, 31, each longitudinal segment of the conductive element 22 is operative to develop a voltage substantially as described above in connection with the first embodiment.

Figure 5:
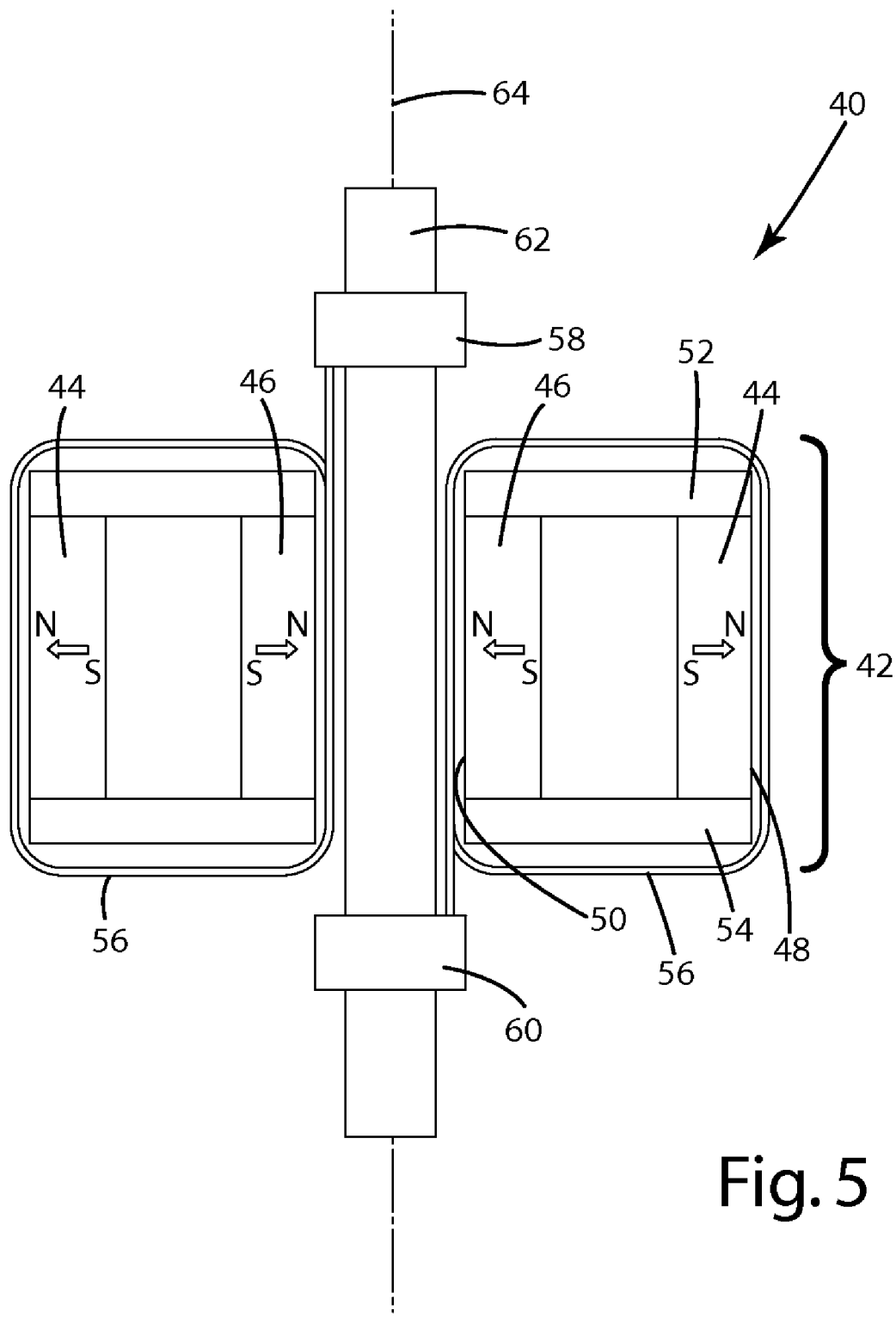
FIG. 5 is a cross-sectional view taken through the axis of rotation of a multi-winding homopolar electric machine according to a third embodiment of the invention.

A third embodiment is shown in FIG. 5 and is generally designated 40. In this embodiment, a toroid-shaped cylinder 42 is formed from concentric first and second ring-shaped magnets 44, 46, where the first magnet 44 has an inner diameter greater than the outer diameter of the second magnet 46. In this embodiment, the first and second magnets 44, 46 are radially magnetized and are positioned in magnetic repulsion with respect to each other, e.g., the outer and inner magnetic surfaces 48, 50 of the toroid-shaped cylinder 42 are of the same magnetic polarity. To at least partially confine the mutually repulsive magnetic field to the annular region between the first and second magnets 44, 46, a first ring-shaped shielding layer 52 forms an upper surface of the toroid-shaped cylinder 42, and a second ring-shaped shielding layer 54 forms a lower surface of the toroid-shaped cylinder 42. In a similar manner as discussed above in connection with the first and second embodiments, the homopolar machine 40 includes a conducting wire 56 forming a toroid coil wound N number of times about the cylinder exterior and the cylinder core. The conducting wire end portions are electrically coupled to first and second contacts 58, 60 disposed on or about a central shaft 62. The contacts 58, 60 are electrically coupled to the load (not shown) by any suitable manner, wherein the conducting element, first and second contacts 58, 60 and load (not shown) form a closed circuit. In this embodiment, the magnetic pole surfaces are parallel to the axis of rotation 64, and the conducting wire 56 is wound toroidally around the longitudinal length of the cylinder 42 such that conducting wire 56 crosses the magnetic poles at the outer and inner periphery of the cylinder 42. When the cylinder 42 is rotated about its longitudinal axis 64, the electrons in each segment of wire 56 along the outer and inner cylinder periphery 48, 50 encounter a Lorentz force due to the radial speed gradient of the cylinder 42. A voltage develops along each section of wire crossing a magnetic pole. Because each section of wire is connected, the voltage applied across the load is additive over the entire length of the winding 56 substantially as described above in connection with the first embodiment.

Figure 6:
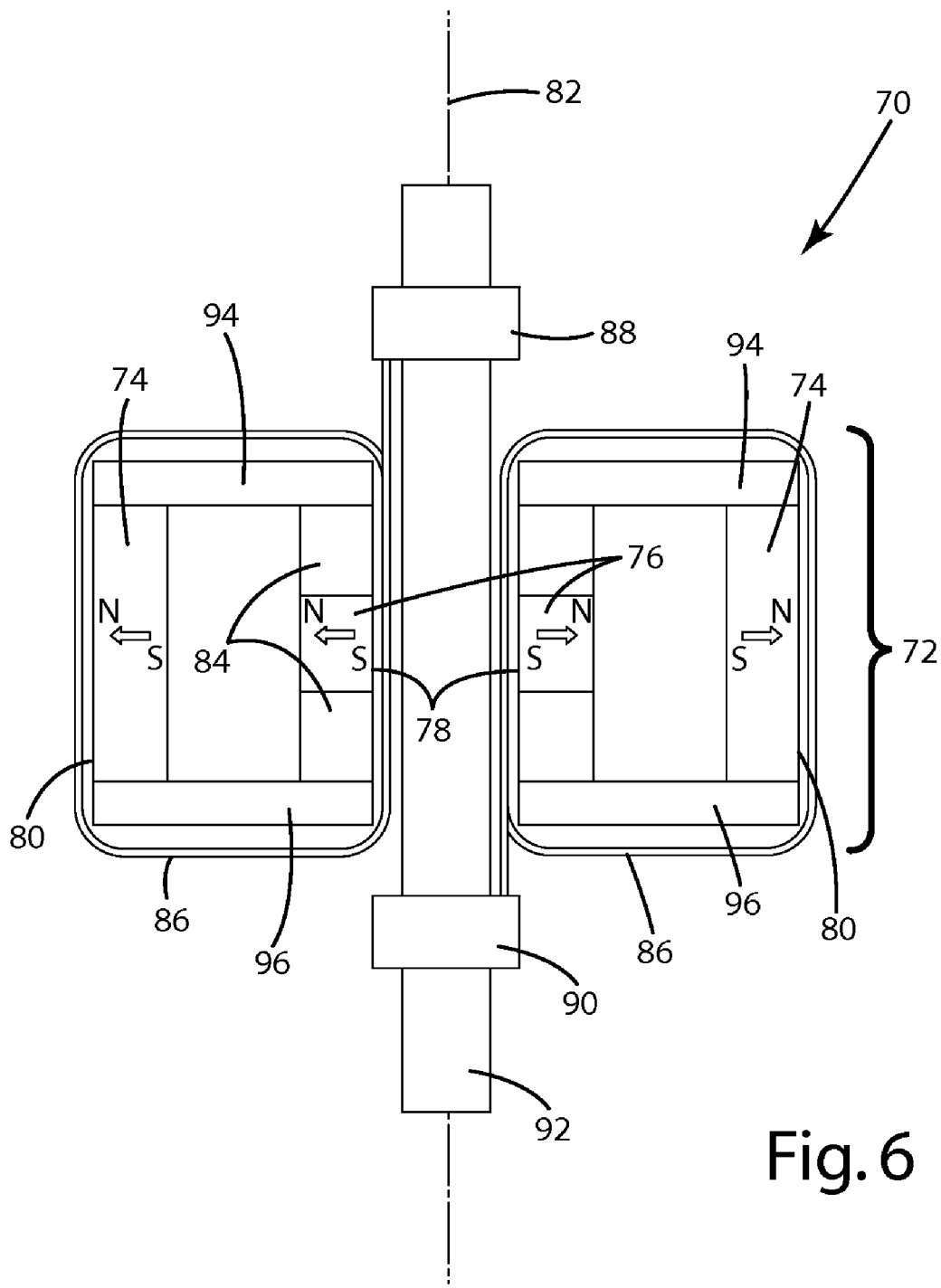
FIG. 6 is a cross-sectional view taken through the axis of rotation of a multi-winding homopolar electric machine according to a fourth embodiment of the invention.

A fourth embodiment is shown in FIG. 6 and is generally designated 70. Similar to the manner described above in connection with the third embodiment, a toroid-shaped cylinder 72 is formed from concentric first and second ring-shaped magnets 74, 76, where the first magnet 74 has an inner diameter greater than the outer diameter of the second magnet 76. Unlike the previous embodiment, however, first and second radially magnetized magnets 74, 76 are positioned in magnetic attraction with respect to each other, e.g., the inner and outer magnetic surfaces 78, 80 of the toroid-shaped cylinder 72 share the opposite magnetic pole. The second magnet 76, being defined as the magnet closest to the axis of rotation 82, is made parametrically smaller than the first magnet 74 with additional shielding portions 84 adjacent the second magnet 76 (e.g., on the axial top and bottom of the second magnet 76). In this embodiment, the voltage developed in a conductive winding 86 across the outer periphery of the first magnet 74 opposes the voltage developed in the conductive winding 86 across the inner periphery of the second magnet 76. However, because the inner magnet 76 has smaller parameters, and hence a smaller corresponding magnetic field adjacent its inner periphery, the voltage developed in the conductive winding 86 across the inner periphery of the second magnet 76 is less than the voltage developed in the conductive winding 86 across the outer periphery of the first magnet 74. In addition, because the conductive winding 86 adjacent the outer magnet 74 moves with greater tangential velocity than the conductive winding adjacent the inner magnet 76, the voltage developed in the outer conductive winding will be greater than the voltage developed in the inner conductive winding. Accordingly, the homopolar machine 70 will develop a net voltage corresponding to the voltage developed in the outer conductive winding less the voltage developed in the inner conductive winding. The voltage induced in the conductive winding 86 can then be applied across first and second contacts 88, 90 to a load (not shown) for the conversion of mechanical energy into a high voltage, directed current.

A method of generating an electrical voltage across two electrical contacts is described below in connection with the homopolar electric machines of FIGS. 1-6. Though described as a method for converting a mechanical input into a DC voltage output, the present invention can also be modified to convert a DC voltage input into a mechanical output. According to both methods of operation, an electrical apparatus is provided, the apparatus including a shaft defining an axis of rotation, first and second magnets, a shield extending between the first and second magnets, and a conductor. The shield can extend partially between the first and second magnets, or can extend fully between the first and second magnets as shown in FIGS. 1-6. It should be noted that the shield is not required to be in direct contact with either or both of the first and second magnets, and can be secured thereto by any suitable means. For example, the shield can be friction fitted to the first and second magnets, and/or can be secured to the first and second magnets using an epoxy or adhesive, for example. The first and second magnets are magnetized and include a charged pole surface and an oppositely charged pole surface, where the magnets are disposed adjacent each other to form a repulsion field therebetween. As alternatively described above in connection with the third embodiment, a charged and oppositely charged pole surface can be disposed adjacent each other to form an attractive magnetic field therebetween. The shield extends between the first and second magnets to at least partially confine the repulsion or attractive magnetic field. If the pole surfaces are perpendicular to the axis of rotation, the shield can include inner and outer portions extending parallel to the axis of rotation. If, however, the pole surfaces are parallel to the axis of rotation, e.g., the first and second magnets are concentric, the shield can include upper and lower shield portions perpendicular to the axis of rotation. As described above in connection with FIGS. 1-6, the shaft is secured to the magnets to define an axis of rotation extending axially through a length of the shaft. The conductor extends between the end portions optionally joined to distal portions of the shaft. In addition, the conductor is coiled about the magnets and the shield such that portions of the conductor extend across the oppositely charged pole surfaces, optionally in the form of a spiral or helical winding. When the conductor end portions are connected across a load, the conducting wire forms a single closed circuit having N number of turns of wire about a toroidal-shaped core defined by the first and second magnets and the shield.

In response to the step of providing the above electrical apparatus, the method further includes rotating the same about the axis of rotation, thus developing a voltage across first and second end portions of the electrical conductor. For example, clockwise rotation of the electrical apparatus 10 of FIG. 1 can result in an outward-axial current being generated in the portions of the conductor extending across the negative magnetic pole surface of the first and second magnets 12, 14. In like manner, counter-clockwise rotation of the electrical apparatus 10 of FIG. 1 can result in an inward-axial current being generated in the portions of the conductor extending across the negative magnetic pole surface of the first and second magnets 12, 14. Accordingly, rotation of the electrical apparatus 10 in a first direction provides a current in the conductor 22, while rotation of the electrical apparatus 10 in a second direction provides a reverse current in the conductor 22. The resulting voltage developed in each of N number of turns is cumulative over the conductor 22, resulting in an increased voltage across the conductor end portions 34, 36 when compared with prior art homopolar systems. The desired output voltage can therefore be controlled based on the number of turns of wire, the strength of the magnetic field adjacent the first and second magnets 12, 14, the rotational velocity and rotational direction of the electrical apparatus 10 about the axis of rotation 38. Accordingly, the above method provides an improved operational flexibility over known homopolar systems while reducing the need for complicated gearing assemblies, and at the same time providing a higher output voltage for a given mechanical input over known homopolar generators.

As used above, directional terminology, including radial/longitudinal, vertical/horizontal, upper/lower, inward/outward and inner/outer, is not intended to limit the present invention, and is instead used to for clarity when referring to the accompanying drawings. It is also understood that ordinal terminology (such as "first", "second", "third" and so on) is used merely to indicate a particular feature, so as to distinguish from another feature described by the same term or a similar term. It will be understood that the mere usage of ordinal terminology does not define a numerical limit to the number of features identified.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The embodiments of the invention in which an exclusive property or privilege is claimed are defined as follows:

1. A method of generating an electrical voltage across two contacts comprising the steps of:
   a) providing an electrical apparatus including,
      a shaft defining an axis of rotation extending axially through a length of said shaft;
      first and second magnets, each of said magnets being rotatable in unison with said shaft and including a charged pole surface and an oppositely charged pole surface, wherein charged pole surfaces face one another to form a repulsion field therebetween,
      magnetic shielding extending between said magnets to confine at least a portion of the repulsion field to between said first and second magnets,
      a conductor including first and second end contacts, said conductor being coiled about said first and second magnets and said magnetic shielding and extending across said oppositely charged pole; and b) rotating said apparatus provided in step a) about the axis of rotation to develop a voltage across the first and second end contacts of the conductor.

2. The method according to claim 1 wherein the magnetic shielding includes an outer cylindrical shielding layer extending between respective outer radial end portions of the first and second magnets, and an inner cylindrical shielding layer extending between respective inner radial end portions of the first and second magnets.

3. The method according to claim 1 wherein the pole surfaces are perpendicular to the axis of rotation.

4. The method according to claim 1 wherein the pole surfaces are parallel to the axis of rotation.

5. The method according to claim 1 wherein the conductor extends in a helical winding about a toroidally-shaped core formed from the first and second magnets and the magnetic shield.

6. The method according to claim 1 wherein the shield circumferentiates the region between the first and second magnets.

7. The method according to claim 1 wherein the first magnet is concentric with the second magnet and defines an inner radius greater than an outer radius of the second magnet.

* * * * *